United States Patent
Kelch et al.

[11] Patent Number: 6,118,068
[45] Date of Patent: Sep. 12, 2000

[54] GAS-INSULATED POWER TRANSMISSION SYSTEM WITH INTERNAL CONDUCTORS FIXED AXIALLY AT INTERVALS

[75] Inventors: Thomas Kelch, Berlin; Mario Kieper, Falkensee; Christoph Bräunlich, Schönefeld, all of Germany

[73] Assignee: Siemens Aktiengesellschaft, Munich, Germany

[21] Appl. No.: 09/142,800

[22] PCT Filed: Mar. 18, 1997

[86] PCT No.: PCT/DE97/00615

§ 371 Date: Jan. 13, 1999

§ 102(e) Date: Jan. 13, 1999

[87] PCT Pub. No.: WO97/35371

PCT Pub. Date: Sep. 25, 1997

[30] Foreign Application Priority Data

Mar. 19, 1996 [DE] Germany ............................ 196 13 026
Apr. 12, 1996 [DE] Germany ............................ 196 16 179
Aug. 16, 1996 [DE] Germany ........................ 296 14 717 U

[51] Int. Cl.[7] ........................................................ H02G 5/06
[52] U.S. Cl. ................................................................ 174/28
[58] Field of Search ............................... 174/21 C, 22 C, 174/21 CA, 24, 28, 99 B, 21 R

[56] References Cited

U.S. PATENT DOCUMENTS 3,331,911 7/1967 Whitehead ............................ 174/22 C
3,372,226 3/1968 Sewell .
4,053,700 10/1977 Meyer ................................... 174/21 C
4,447,671 5/1984 Czech et al. ............................. 174/28

FOREIGN PATENT DOCUMENTS

| | | |
|---|---|---|
| 0 597 147 | 5/1994 | European Pat. Off. . |
| 0 660 478 | 6/1995 | European Pat. Off. . |
| 0 660 479 | 6/1995 | European Pat. Off. . |
| 2 714 204 | 6/1995 | France . |
| 2 716 521 | 8/1995 | France . |
| 108 860 | 10/1974 | Germany . |
| 7 323 367 | 4/1975 | Germany . |
| 26 25 252 | 12/1976 | Germany . |
| 26 24 908 | 12/1977 | Germany . |
| 453 460 | 6/1968 | Switzerland . |
| 677 046 | 3/1991 | Switzerland . |
| 2 044 513 | 10/1980 | United Kingdom . |

OTHER PUBLICATIONS

Multi–Contact, "MC–Technology Applications", Ho 15, pp. 1–2.

Primary Examiner—Kristine Kincaid
Assistant Examiner—Chau N. Nguyen
Attorney, Agent, or Firm—Kenyon & Kenyon

[57] ABSTRACT

Attachment points of an internal conductor in single-phase gas-insulated power transmission systems with tubular external and internal conductors are designed to have high dielectric strength and are of simple design, an end piece (6) of internal conductor is axially secured in a post insulator two head pieces (61, 71) radially and axially secured in a feed-through bore of the post insulator and axially connected to one another. The head pieces are configured as control electrodes. One head-shaped piece is also used as a plug contact with the adjacent internal conductor section.

5 Claims, 4 Drawing Sheets

GAS-INSULATED POWER TRANSMISSION SYSTEM WITH INTERNAL CONDUCTORS FIXED AXIALLY AT INTERVALS

FIELD OF THE INVENTION

The present invention relates to the field of energy distribution and is to be used in the design of a gas-insulated power transmission system, in which a tubular internal conductor constructed from a plurality of pluggably interconnected sections using insulating spacers is arranged in a tubular external conductor, and in which one end of the respective internal conductor section is also axially secured using a disk-shaped post insulator axially attached to the external conductor. The present invention relates to the design of the attachment area.

BACKGROUND INFORMATION

In order to radially secure a tubular internal conductor section in the area of an internal conductor plug-and-socket connection, the respective end of the internal conductor section can be provided with a tubular end piece, which is firmly connected to the rest of the internal conductor section and, for reasons of assembly and to compensate for temperature-related length changes, is also used as a plug-and-socket contact for a socket arranged at the end of the other internal conductor section end piece is form-fittingly surrounded, in the area of a central feed-through bore of a disk-shaped conical post insulator, by the latter, for which purpose the smallest internal diameter of the feed-through bore is selected to be smaller than the outer diameter of the internal conductor section, and the tubular end piece is provided with a profile in this area. The post insulator is also axially secured with its outer edge in the contact area of the two mating external conductor sections, the internal conductor plug-and-socket connection has approximately the same diameter as the internal conductor and is surrounded by a tubular shield electrode (German Patent 26 25 255 A/U.S. Pat. No. 4,053,700). In another internal conductor plug-and-socket connection with a similar function, the tubular end piece is designed as two pieces. Each of the two pieces forms a control electrode that radially extends beyond the internal conductor two pieces are secured with this control electrode against two short annular flanges in the area of the feed-through opening of the respective post insulator and friction-locked together through the feed-through opening. One head-shaped piece is directly connected to the tubular piece of the internal conductor section. The other piece, provided with an attachment flange, changes over into a socket, which has a hollow cylindrical sliding contact, which in turn encloses the end, designed as a cylindrical plug contact, of the adjacent internal conductor section. (European Patent No. 0 660 479 A1).

In another conventional power transmission system (German Patent Document No. 73 23 367) the transition area between two internal conductor sections designed as a plug-and-socket connection has a considerably smaller diameter than the outer diameter of the internal conductor and is surrounded by a shield sleeve that is in displaceable contact with one internal conductor section. The respective ends of the tubular internal conductor are provided with end pieces also referred to as transition pieces, one of which encloses a hollow cylindrical socket, mounted in a ball shape, and the other one is provided with a tubular plug-and-socket contact, on whose cylindrical surface the socket is axially displaceably mounted.

The the internal conductor also can be axially secured in the area of a rigid conductor connection by providing both ends of the internal conductor sections with head-shaped end pieces, which are friction-locked with one another through the feed-through bore of the disk-shaped post insulator and axially and radially positively secured in this feed-through bore. For this purpose, one of the head-shaped end pieces is provided with steps, which, together with the other head-shaped end piece, forms a kind of constriction with which the post insulator engages. In the area of this constriction, the head parts are slightly rounded in order to avoid strong increases in the intensity of the electric field (U.S. Pat. No. 3,372,226, Swiss Patent No. 453 460/U.S. Pat. No. 3,331,911).

SUMMARY OF THE INVENTION

An object of the present invention is to simplify the construction for securing an internal conductor section and thus designing it in an assembly-friendly manner, as well as adapting it to maximum transmission voltages of approximately 400 kV and over.

To achieve this object according to the present invention, the post insulator is provided with a short annular flange on both sides in the area of the feed-through bore end piece of the internal conductor section has two head-shaped pieces, which are friction-locked with one another through the feed-through bore and radially extend beyond the feed-through bore of the insulator and the annular flange and are in contact with the annular flange. The head-shaped pieces are designed as control electrodes in the area extending beyond the annular flange, one head-shaped part being firmly connected to the tubular piece of the internal conductor section and the other head-shaped piece changing into a tubular extension forming the cylindrical plug-and-socket contact.

For such a design of the end piece and the post insulator, the functions of axially and radially securing an internal conductor section and compensating for length changes of the internal conductor section required by temperature influences are combined so that both an assembly-friendly and mechanically reliable securing of the internal conductor section and the required dielectric strength in the field intensity ranges that are critical from the design standpoint are ensured.

In order to configure the electrical field conditions of the internal conductor attachment point and the internal conductor plug-and-socket connection so that they are not less favorable than they are in the remaining portion of an internal conductor section, the maximum outer diameter of the head-shaped end pieces should not exceed that of the internal conductor. Therefore, it is recommended that the outer diameter of the tubular extension provided on a head-shaped piece be smaller than the outer diameter of the area of the head-shaped piece designed as a control electrode. This makes it possible to select a shape for the area designed as a control electrode that ensures a favorable field intensity distribution even upon insertion in the socket of the adjacent internal conductor section.

For mechanical and electrical reasons, it has proved to be advantageous to design disk-shaped post insulators of gas-insulated tubular conductor systems conically or in a bowl shape. The changes in the electric field distribution in the area of a post insulator caused by this design is advantageously taken into account in this case by selecting the outer diameter of the head-shaped piece surrounded by the post insulator to be smaller than the outer diameter of the adjacent internal conductor section.

The high-voltage-resistant plug-and-socket connector provided with a head-shaped piece is advantageously designed so that the adjacent internal conductor section is provided with a control electrode with the same diameter and which also forms a hollow cylindrical sliding contact. In order to take into account small angular deviations that may occur in the area of a conductor connection, the sliding contact must have a corresponding contact piece separate from the control electrode, and the contact piece must be designed in the known manner with a spherical external profile and be mounted in the control electrode.

DETAILED DESCRIPTION

Figure 1:
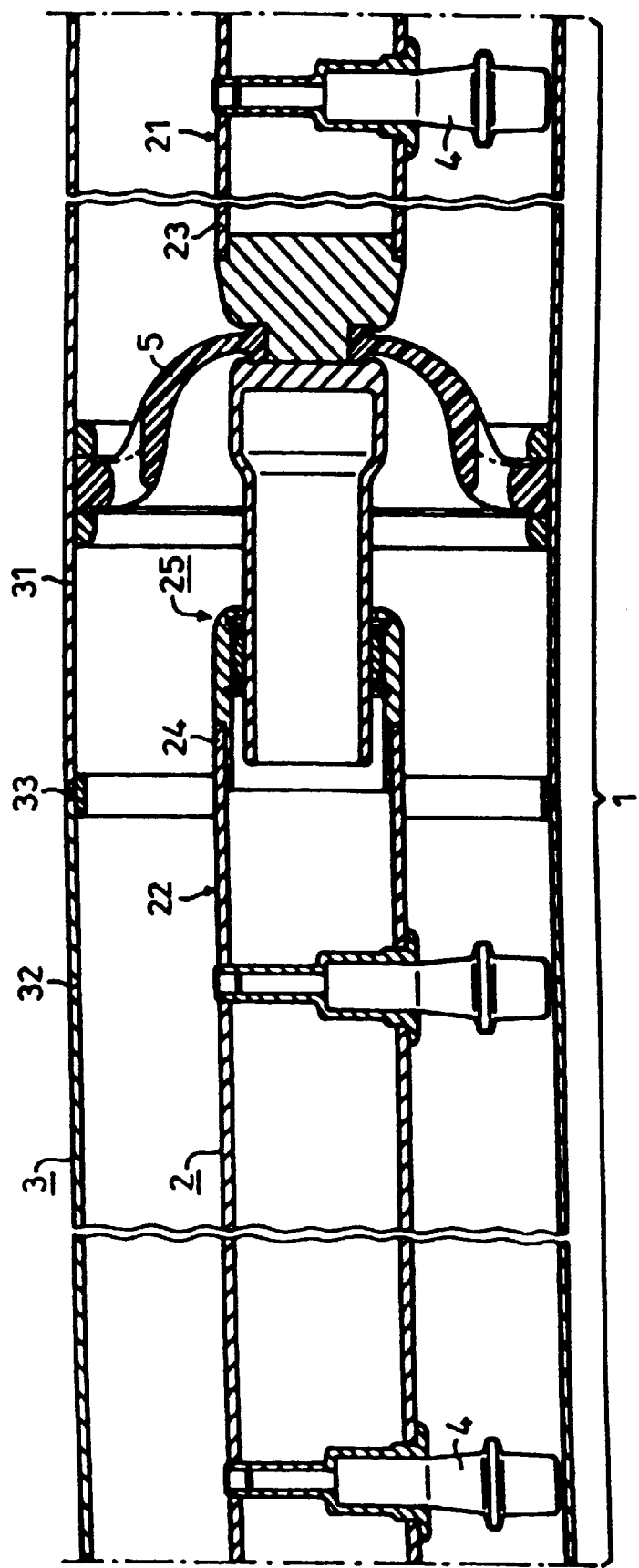
FIG. 1 shows the arrangement of an attachment point in a power transmission system with the post insulator being axially secured using annular electrodes in accordance with the present invention.

FIG. 1 shows a longitudinal section 1 of a gas-insulated power transmission system, including an internal conductor 2, an external conductor 3, and insulating spacers 4, with which internal conductor 2 is held centered with respect to external conductor 3. Two external conductor sections 31 and 32 are connected in the area of a contact point using a welded connection 33. Next to this connection point, a disk-shaped post insulator 5 is positioned with whose help an internal conductor section 21 is axially secured and in whose area the adjacent internal conductor section 22 is pluggably connected with internal conductor section 21. For this purpose, internal conductor sections 21 and 22 are specially configured at their ends 23 and 24. Insulating spacers 4, with which internal conductor 2 is held between two axially secured disk-shaped post insulators 5, are described, for example, in German Patent No. A 44 44 554.

Figure 2:
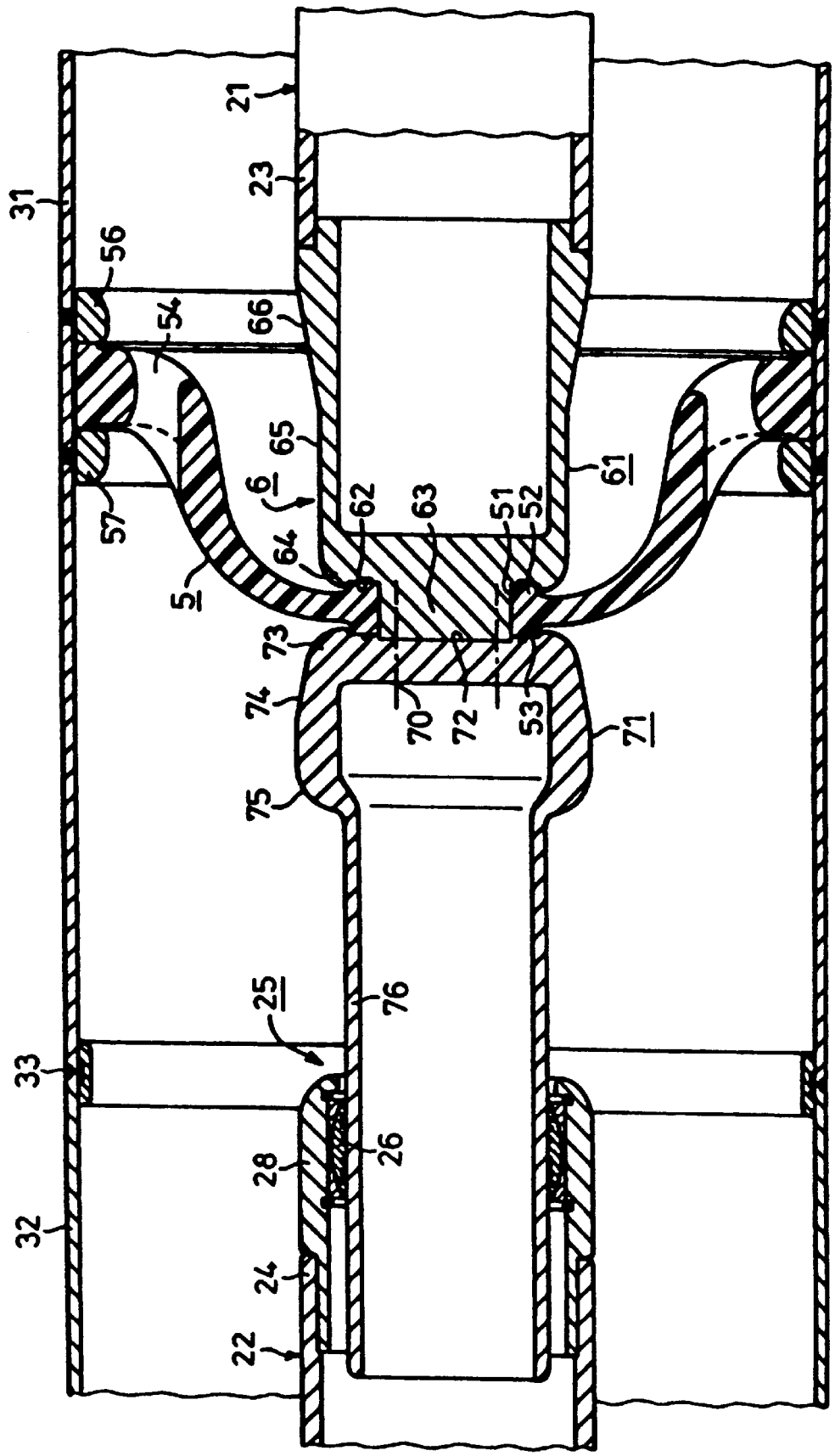
FIG. 2 shows a conductor attachment point with a conical post insulator opening toward the internal conductor in accordance with the present invention.

According to FIG. 2, disk-shaped post insulator 5 is axially secured in external conductor section 31 with the help of two annular electrodes 56 and 57 in a known manner. Annular electrodes 56 and 57 are connected to external conductor section 31 with the help of gas-tight plug welds. Disk-shaped post insulator 5 is an insulator with axial orifices 54, which is thus designed to be gas-permeable. Without such orifices it can also be used as a bulkhead insulator if it is appropriately sealed in the area of attachment to external conductor section 31, for example, clamped between two connecting flanges.

In order to axially secure internal conductor section 21 on post insulator 5, the bowl-shaped post insulator is provided in its bottom area with a feed-through opening 51, whose diameter is smaller than the outer diameter of internal conductor section 21. Internal conductor section 21 is also provided, at its end 23, with an end piece 6, with which the disk-shaped insulator positively engages with its feed-through opening 51. For this purpose, end piece 6 features a first head-shaped piece 61 and a second head-shaped piece 71, which are friction-locked through feed-through opening 51 of insulator 5 with the help of screws 70. In order to create a good electrical junction, head piece 61 is provided with a short cylindrical extension 63, which extends through feed-through opening 51 and thus radially secures end piece 6 in post insulator 5. Cylindrical extension 63 axially contacts the top surface of head-shaped piece 71 in the area of a flat recess 72, whereby the required electric contact is ensured between head pieces 61 and 71.

Top surface 62 of head-shaped piece 61 and the corresponding top surface of head-shaped piece 71 are axially in contact with the post insulator in the area of two annular flanges 52 and 53. Ring gaskets (not illustrated) are arranged in the area of this flange. With flanges 52 and 53, a space is also created allowing the two head-shaped pieces 61 and 71 to be configured as control electrodes 64 and 73, respectively, at the edges of their top surfaces. In addition to a rounding in this edge area, a projection that is nose-shaped in its cross-section is provided, with which control electrodes 64 and 73 engage the two flanges 52 and 53 from behind. Head-shaped pieces 61 and 71 are dimensioned so that they radially extend beyond flanges 52 and 53.

Head-shaped piece 61 is surrounded by the conical or bowl-shaped area of insulator 5. In this area, head-shaped piece 61 has a cylindrical area 65 where it is connected to control electrode 64; the outer diameter of this cylindrical area is selected to be smaller than that of internal conductor section 21. A conical area 66 follows cylindrical area 65 forming a transition to internal conductor section 21. At the end of this conical area, head-shaped end piece is connected to end 23 of internal conductor section 21 positively or by friction.

Head-shaped piece 71 is provided, where it is connected to control electrode 73, with a slightly conical section 74 and, next to it, with a rounded area 75, which changes over to a tubular part 76. While head-shaped piece 71 has a maximum outer diameter in the area configured as a control electrode, which corresponds to the outer diameter of internal conductor section 22, the outer diameter of the tubular extension 76 is smaller so it can be used as a cylindrical plug-in contact of plug-and-socket connection 25. A cylindrical contact part 28, configured as a control electrode, which is firmly connected to the inner conductor with the same diameter as internal conductor section 22 and surrounds a hollow cylindrical contact piece 26, is used as the socket for connecting end 24 of internal conductor section 22 with cylindrical plug contact 76. Contact piece 26 is provided on its inner surface with two contact plates not shown in the drawing. It is spherically shaped on its outer perimeter and is rotatably mounted in contact piece 28 via guide elements that are not shown in detail. Contact piece 28 has another annular contact plate, not illustrated, which ensures reliable electrical contact of contact piece 28 with contact piece 26 and thus with tubular extension 76. Such a configuration of the contact pieces is conventional (see, for example, Brochure Ho No. 15 of MultiKontakt AG (Switzerland) and German Patent Application No. 196 16 179.7).

Figure 3:
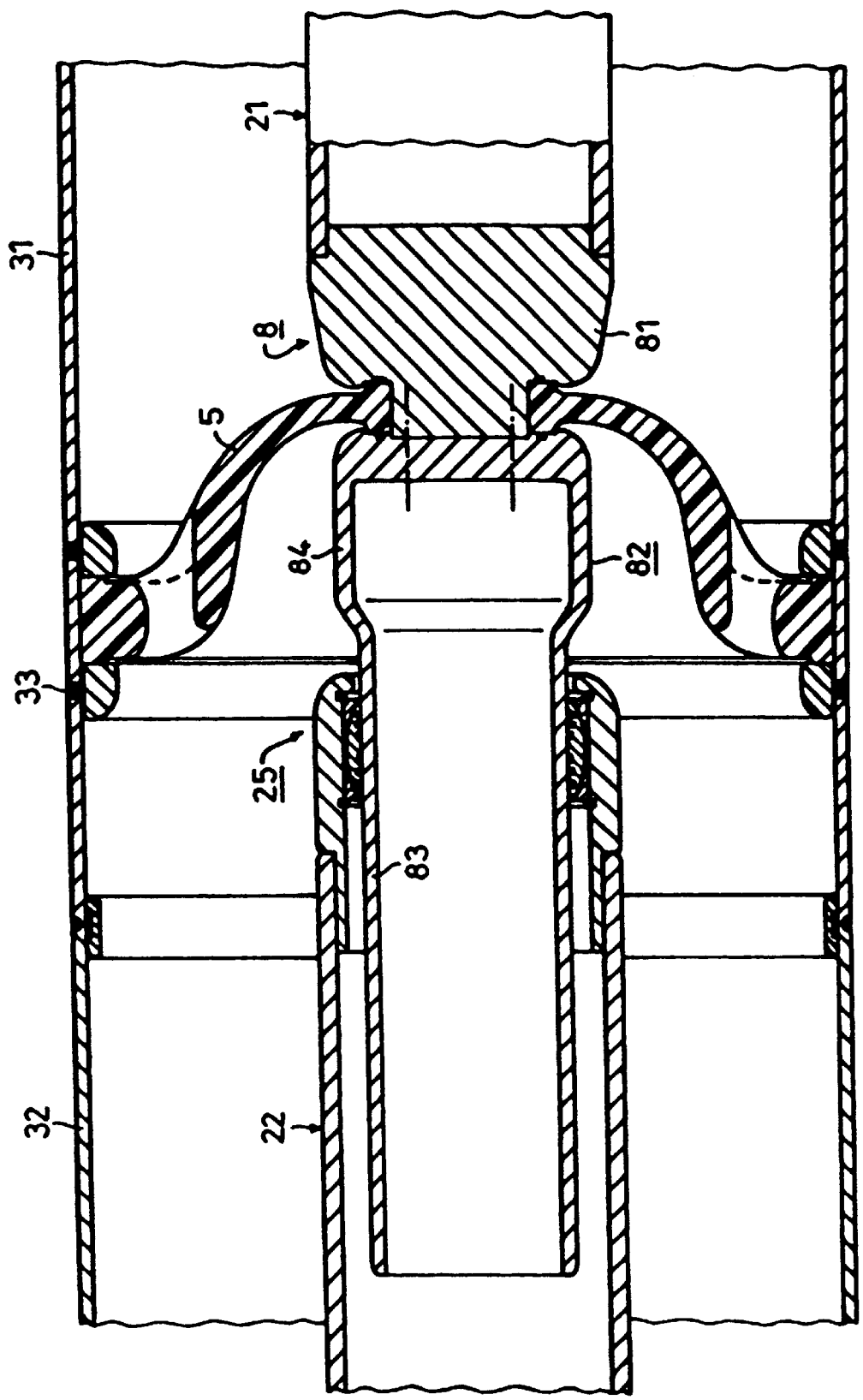
FIG. 3 shows a conductor attachment point with a conical post insulator opening toward the plug connector.

According to FIG. 3, disk-shaped post insulator 5 projects, with its conical area, into external conductor section 31. This makes it possible to arrange post insulator 5 closer to point of connection 33 of the two external conductor sections 31 and 32. This, however, requires a somewhat different configuration of end piece 8 of internal conductor section 21 than in the embodiment according to FIG. 2. End piece 8 is also here composed of two parts, namely head-shaped part 81 and head-shaped part 82, head-shaped part 81 having basically the design of head-shaped part 61 of FIG. 2, but with the difference that the part is shorter overall, since a cylindrical area connecting to the actual control electrode is not required. On the other hand, the maximum outer diameter of head-shaped piece 82 is smaller than that of the adjacent internal conductor section 22. In principle, there are also two rounded areas functioning as control electrodes, but there is only a cylindrical area 84, and no conical area between them. Plug connector 25 is designed as the plug connector of FIG. 2. It is only illustrated in a position that takes into account the maximum possible extension of internal conductor section 22 on tubular plug-in piece 83.

Figure 4:
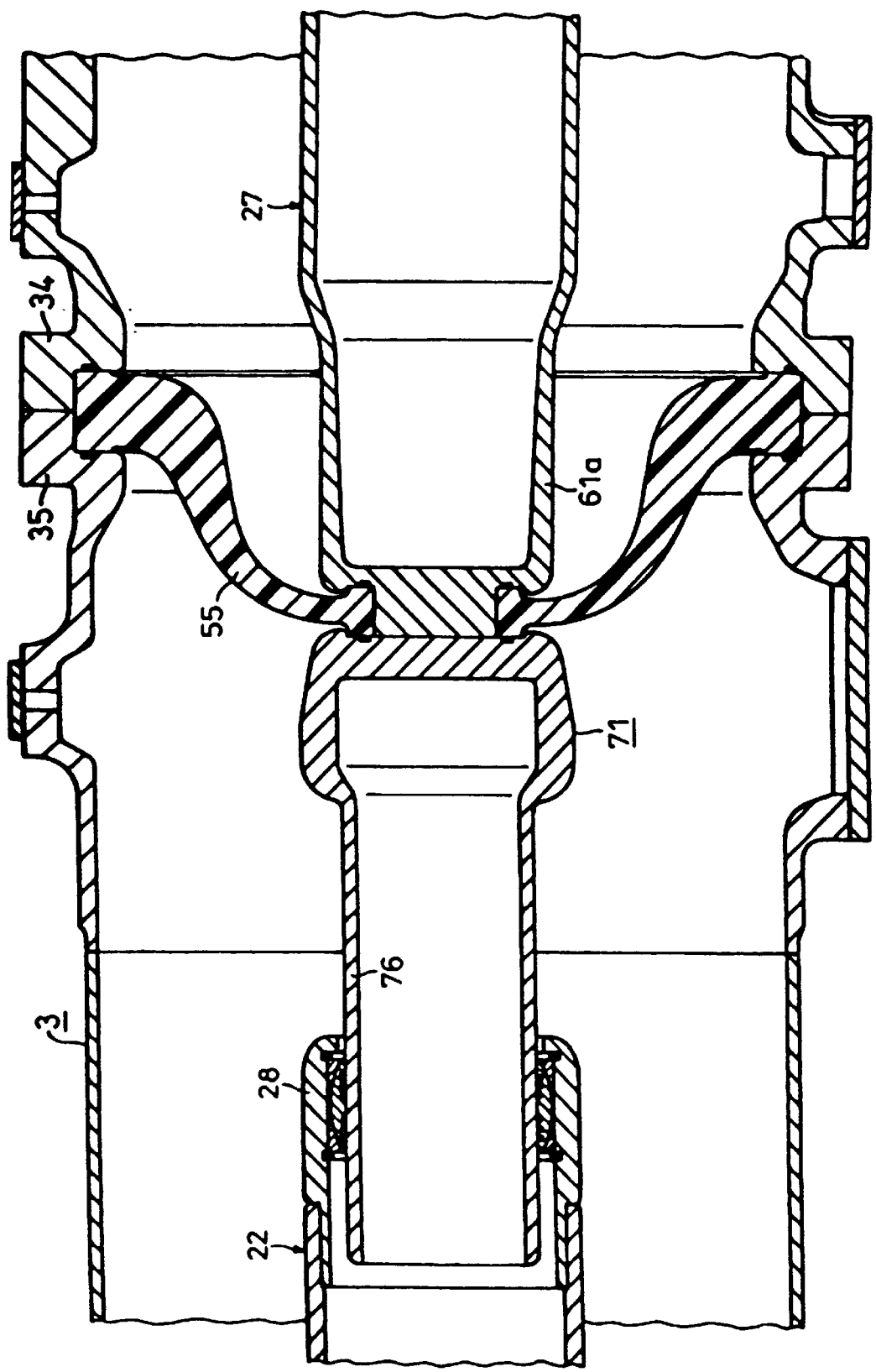
FIG. 4 shows a conductor attachment point with an axially secured post insulator in the area of an external conductor flange connection in accordance with the present invention.

FIG. 4 shows an internal conductor attachment point in the area of a gas-impermeable post insulator 55, known as a bulkhead insulator. The outer edge of the bulkhead insulator is clamped between two connecting flanges 34 and 35, arranged on two housing-type enclosure parts of external conductor 3. In this embodiment, head-shaped end piece 61a of internal conductor 27 is designed in one piece with internal conductor section 27. This is important especially when internal conductor section 27 is a relatively short internal conductor piece, subsequently connected firmly or detachably to another internal conductor piece. The second head-shaped piece 71 corresponds to head-shaped piece 71 of FIG. 2. For the plug-and-socket connection between internal conductor section 22 and tubular extension 76, control electrode 25 forms the actual contact piece here and is in contact with plug contact 76 via a plate contact.

What is claimed is:

1. A gas-permeable power transmission system, comprising:

a tubular internal conductor including internal conductor sections, the internal conductor sections connected to one another via a plug-and-socket connection;

a tubular external conductor arranged concentrically with the tubular internal conductor and including external conductor sections;

insulating spacers supporting the tubular internal conductor in the tubular external conductor;

a disk-shaped post insulator axially securing one end of a first one of the internal conductor sections in the tubular external conductor, the disk-shaped post insulator having a central feed-through bore and being axially secured to the tubular external conductor and tightly surrounding the tubular internal conductor in an area of the central feed-through bore, the central feed-through bore having a diameter which is smaller than an outer diameter of the tubular internal conductor, the one end of the first one of the internal conductor sections including an end piece in an area of the disk-shaped post insulator, the end piece firmly connected to a second one of the internal conductor sections, the end piece including a cylindrical plug contact of a plug-and-socket connector, a hollow cylindrical sliding contact being attached to an end of the second one of the internal conductor sections, a socket of the plug-and-socket connector being formed by the end of the second one of the internal conductor sections and the hollow cylindrical sliding contact, the disk-shaped post insulator having short annular flanges, the short annular flanges positioned on first and second sides of the disk-shaped post insulator and being in the area of the central feed-through bore, the end piece including head-shaped pieces which are friction-locked to one another through the central feed-through bore, the head-shaped pieces radially extending beyond the central feed-through bore and the short annular flanges, each of the head-shaped pieces being in contact with the annular flanges and being configured as a first control electrode with a nose-shaped cross section projection, each nose-shaped cross section projection engaging a respective one of the annular flanges from behind, a first one of the head-shaped pieces being directly and firmly connected to a tubular portion of the first one of the internal conductor sections, a second one of the head-shaped pieces including a tubular extension forming the cylindrical plug contact.

2. The gas-insulated power transmission system according to claim 1, wherein an outer diameter of the tubular extension is smaller than an outer diameter of an area of the second one of the head shaped pieces configured as the first control electrode.

3. The gas-insulated power transmission system according to claim 1, wherein the disk-shaped post insulator has a conical shape, an outer diameter of the first one of the head-shaped pieces being smaller than that of the first one of the internal conductor sections.

4. The gas-insulated power transmission system according to claim 1, wherein the end of the second one of the internal conductor sections includes a second control electrode, the second control electrode having a substantially same diameter as a diameter of the hollow cylindrical sliding contact.

5. The gas-insulated power transmission system according to claim 4, wherein the hollow cylindrical sliding contact includes a contact piece separated from the second control electrode, the contact piece having a spherically shaped outer periphery and being rotatably mounted on the second control electrode.

* * * * *